(12) United States Patent
Hauptmann et al.

(10) Patent No.: US 7,164,708 B1
(45) Date of Patent: Jan. 16, 2007

(54) LINE TERMINATION DEVICE FOR A TELEPHONE SUBSCRIBER LINE

(75) Inventors: Joerg Hauptmann, Wernberg (AT); Christian Schranz, Villach (AT); Bernhard Zojer, Villach (AT); Peter Pessl, Villach (AT); David Schwingshackl, Villach (AT); Herbert Zoler, Villach (AT)

(73) Assignee: Infineon Technologies AG, Munich (DE)

( * ) Notice: Subject to any disclaimer, the term of this patent is extended or adjusted under 35 U.S.C. 154(b) by 702 days.

(21) Appl. No.: 10/031,034

(22) PCT Filed: Jul. 12, 2000

(86) PCT No.: PCT/DE00/02271

§ 371 (c)(1),
(2), (4) Date: Apr. 15, 2002

(87) PCT Pub. No.: WO01/06749

PCT Pub. Date: Jan. 25, 2001

(30) Foreign Application Priority Data

Jul. 16, 1999 (DE) .............................. 199 33 485

(51) Int. Cl.
*H04B 1/38* (2006.01)

(52) U.S. Cl. ..................................... 375/222; 370/286
(58) Field of Classification Search ................ 375/220, 375/222, 257, 377; 370/282, 286, 289–290; 379/93.01, 93.09, 93.11; 327/551, 552
See application file for complete search history.

(56) References Cited

U.S. PATENT DOCUMENTS

| 5,889,856 A | * | 3/1999 | O'Toole et al. | ......... 379/399.02 |
| 5,969,567 A | * | 10/1999 | Kahl et al. | ................... 327/552 |
| 6,067,316 A | * | 5/2000 | Amrany et al. | ............. 375/220 |

FOREIGN PATENT DOCUMENTS

EP        0929160        7/1999

* cited by examiner

*Primary Examiner*—Khanh Tran (57) ABSTRACT

In the line terminating device, which is provided for transmitting and receiving narrowband low-frequency voice signals and broadband data signals at a higher frequency, the analog reception path is subdivided into two separate analog paths (32, 33) for voice and data using a balance filter (49), which is used for data signal echo cancellation. In the transmission direction, the voice signal path and the data signal path are separated in the digital part by means of digital filters (43, 45). The invention is used for voice and data signal separation in xDSL methods, for example, ADSL.Lite.

13 Claims, 9 Drawing Sheets

LINE TERMINATION DEVICE FOR A TELEPHONE SUBSCRIBER LINE

BACKGROUND OF THE INVENTION

1. Field of the Invention

The invention relates to a line terminating device as claimed in the preamble of patent claim 1.

2. Description of the Related Art

Voice is transmitted in analog form via an analog subscriber access in a telephone network. This is done using a frequency band, referred to as the voice band, which represents only a relatively narrow frequency band from the entire transmission bandwidth of a double copper wire (POTS=Plain Old Telephone System). In what are referred to as the xDSL transmission methods (xDSL=x-Digital Subscriber Line), the frequency bands above the voice band are also used for broadband data transmission in a telephone network.

xDSL transmission methods include HDSL (High Bit Rate Digital Subscriber Line), ADSL (Asymmetric Digital Subscriber Line) and VDSL (Very High Speed Digital Subscriber Line). xDSL transmission methods are referred to as broadband network access (broadband access technology) and include all transmission methods via a telephone network which allow a higher data transmission rate between a subscriber and the central office (CO) than the data transmission rate achievable using voice band modems. In xDSL transmission methods, what is referred to as xDSL data signal, which denotes a digital signal coded for the xDSL transmission method, is transmitted for this purpose in a higher frequency band, the data band, which is separated from the voice band. In theory, xDSL transmission methods can use the entire bandwidth available above the voice band with double copper wires, and can achieve data transmission rates in the Mbps range.

Despite voice and data being transmitted separately in different frequency bands, interference frequency signals from the voice band can enter the data band, and vice versa, in xDSL transmission methods. Control signals, which are used in particular in the voice band, such as ringing signals and charge pulses, can cause interference in the data band and can interrupt, or even entirely terminate, data transmission. To avoid such interference, the voice and data bands must be separated before further processing. Frequency splitters, which are referred to as POTS splitters, are required for this purpose which, at the receiving end, separate a broadband signal into a narrowband low-frequency voice signal and a broadband higher-frequency data signal and, at the transmission end, filter voice signals and data signals, and join them together to form a broadband signal.

A POTS splitter is known from U.S. Pat. No. 5,757,803, which has an analog low-pass filter and two capacitances, with the low-pass filter, which has a passband for the voice band, being connected upstream of an analog subscriber terminal, and capacitances which suppress the two control signals from the voice band being connected, upstream of an xDSL transmitter/receiver. The xDSL transmitter/receiver, which is connected via the two capacitances to a subscriber access line, contains further analog high-pass filters which, together with the two capacitances, separate the data band from the voice band.

An ADSL transmitter/receiver is known from U.S. Pat. No. 5,742,527, which receives and transmits a broadband signal via a subscriber access line and, in the process, filters an analog voice signal out of the received signal using a bandpass filter. An ADSL signal which is to be transmitted is likewise filtered using a bandpass filter, in order to remove from the voice band interference frequencies which can pass from the ADSL signal to the voice band, and in order not to influence the voice band transmission. Following an analog/digital converter, the ADSL receiver contains a decimator, which filters an ISDN signal which is present in the signal out of the received signal. The ADSL transmitter has an interpolator with a high-pass filter function, which is arranged upstream of a digital/analog converter and filters interference frequency signals which are in the voice band out of an ADSL signal which is to be transmitted.

These known solutions have the disadvantage that analog filters are always required, which are formed from active and/or passive elements. Since steep filter flanks are necessary in order to separate the voice band and data band, higher-order filters must be used, which are highly complex and expensive when in the form of analog filters. Furthermore, a solution using analog filters can be matched only with great difficulty to specification changes, for example when the separation frequency between the voice band and data band should be changed.

A line access device which is advantageous in comparison to this has been proposed in German Patent Application DE 198 44 941.0, in which the use of analog separating filters is avoided and, in consequence, matching to specification changes can also be carried out more easily.

This line access device contains an analog/digital converter, which converts an analog broadband received signal, supplied to it, to a digital received signal, a digital/analog converter which converts a digital transmission signal to an analog broadband transmission signal, and a digital frequency splitter, which follows the analog/digital converter and the digital/analog converter and which separates the digital received signal into a first digital voice signal and a first digital data signal, and joins a second digital voice signal and a second digital data signal together to form the digital transmission signal.

In consequence, the broadband received signal is in this case separated into a first digital voice signal and a first digital data signal, and the second digital voice signal and the second digital data signal are joined together to form the broadband transmission signal using digital means. However, despite all the advantages, this proposed solution still has mutual interactions between the two transmission systems, namely that for transmitting data signals and that for transmitting voice signals.

BRIEF SUMMARY OF THE INVENTION

The invention is thus based on the object of designing the separation of the low-frequency narrowband voice transmission and the higher-frequency broadband data transmission in a line terminating device such that, on the one hand, no analog POTS splitters may be used and, on the other hand, the two transmission systems, that is to say that for transmitting data signals and that for transmitting voice signals, can operate completely independently of one another.

According to the invention, this object is achieved in a line terminating device of this generic type by means of the features specified in the distinguishing part of patent claim 1.

Expedient developments and embodiments of the invention are specified in the dependent claims.

There is therefore no need whatsoever for any analog POTS splitters in the line terminating device according to the invention. The additional separation, according to the invention, of the analog reception path into two separate paths for voice and data means that these two paths can be configured individually, and, in particular, different automatic gain control (AGC) circuits in these two paths lead to the performance of analog/digital converters being optimally matched to the appropriate signal levels.

In addition, a voice band modem can also be used via the data signal path, which is separated in the reception path, by using a high-pass filter which can be switched off. In this case, the echo cancellation path for the data signals and the impedance matching loop differ, making it possible to satisfy different impedance requirements with minimal mutual interaction. The balance filter required for analog echo cancellation, which is known per se from DE 196 11 941 C1, may be in analog or digital form. The invention has made possible a flexible (voice band modem, echo cancellation, frequency-division multiplexing), cost-effective and high-quality solution for a line terminating device.

The essential feature of the line terminating device according to the invention is thus the separation of the voice band and data band in the reception channel by means of two analog paths and in the transmission channel by means of digital filter means and, furthermore, the use of a balance filter path for echo suppression and, in addition, an impedance matching loop.

The line terminating device according to the invention may be used not only in a central office (CO) but also on a line access card (data/voice line card) by the subscriber, for example in an ADSL transmitter/receiver. In the central office, the line terminating device follows a subscriber line circuit (SLIC=Subscriber Line Interface Circuit), which supplies line current to the subscriber line. If the subscriber has a line terminating device, then a transformer circuit can be used to couple the subscriber access line to the line terminating device.

The line terminating device according to the invention advantageously makes use of integrated circuit technology.

If it is intended to arrange the line terminating device in a central office, then its entire architecture within a chip set can be split between two integrated circuit modules, one of which is already used as an analog high-voltage module for the subscriber line circuit (B-SLIC=Broadband Subscriber Line Interface Circuit) and need have added to it only the balance filter, which is used for data echo cancellation and thus carries out the separation in the upstream direction into a signal path for voice and a signal path for data, and the subtraction element associated with it. The rest of the line terminating device according to the invention, that is to say also the separation for the downstream direction in the area of the digital filter means, is then integrated in a separate low-voltage module, which is connected to the integrated high-voltage module.

The overall architecture of the line terminating device according to the invention may, however, also be combined in a single integrated module, with a suitable configuration.

BRIEF DESCRIPTION OF THE DRAWINGS

The invention and its advantages, features, embodiment options and application options will be described in the following text with reference to drawings, in which.

DETAILED DESCRIPTION OF EXEMPLARY EMBODIMENTS

Figure 1:
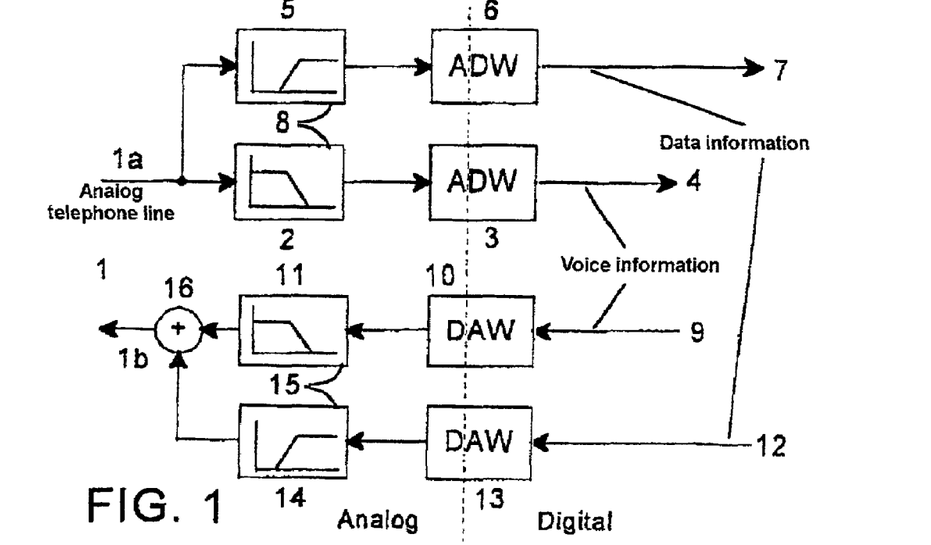
FIG. 1 shows the outline circuit diagram of a known solution of a line terminating device with an analog POTS splitter.

FIG. 1 shows the outline circuit diagram of a known solution of a line terminating device with an analog POTS splitter. A broadband analog signal is carried in the reception path to an analog low-pass filter 2, which is designed such that only signals from the voice band pass through it, in a first transmission direction, namely in the reception direction of the illustrated line terminating device, via the receiving line 1a of an analog telephone subscriber access line 1.

The analog low-pass filter 2 is followed by an analog/digital converter 3, which emits the digitized voice band signal as digital voice information at an output 4, in order to pass it on. The broadband analog signal arriving via the receiving line 1a of the telephone subscriber access line 1 is passed in parallel in the reception path to an analog high-pass filter 5, which is designed such that only signals from the data band are passed through it.

The high-pass filter 5 is also followed by an analog/digital converter 6, which emits the digitized data band signal as digital data information at an output 7 for passing it on. The analog low-pass filter 2 and the analog high-pass filter 5 together form an analog POTS splitter 8.

In the opposite transmission direction, that is to say in the reception direction of the illustrated line terminating device, digital voice information is supplied via an input 9 to a digital/analog converter 10, from where it is passed as an analog voice signal to an analog low-pass filter 11, which is designed such that only signals from the voice band are passed through it.

Digital data information is likewise supplied in this transmission direction via an input 12 to a digital/analog converter 13, and is passed from there as an analog data signal to an analog high-pass filter 14, which is designed such that only signals from the data band are passed through it.

The analog and filtered-out voice and data signals respectively from the analog low-pass filter 11 and the high-pass filter 14, which form an analog POTS splitter 15, are joined together by means of an adder 16, and are supplied to the transmission line 1b of the analog telephone subscriber access line 1.

Steep filter flanks for separating the voice band and data band there are in each case required for the analog POTS splitter 8, which is provided in the first transmission path, with the low-pass filter 2 and the high-pass filter 5, and for the analog POTS splitter 15, which is provided in the opposite transmission path, with the low-pass filter 11 and the high-pass filter 14, so that higher-order filters must be used, which are highly complex and are not really variable.

Figure 2:
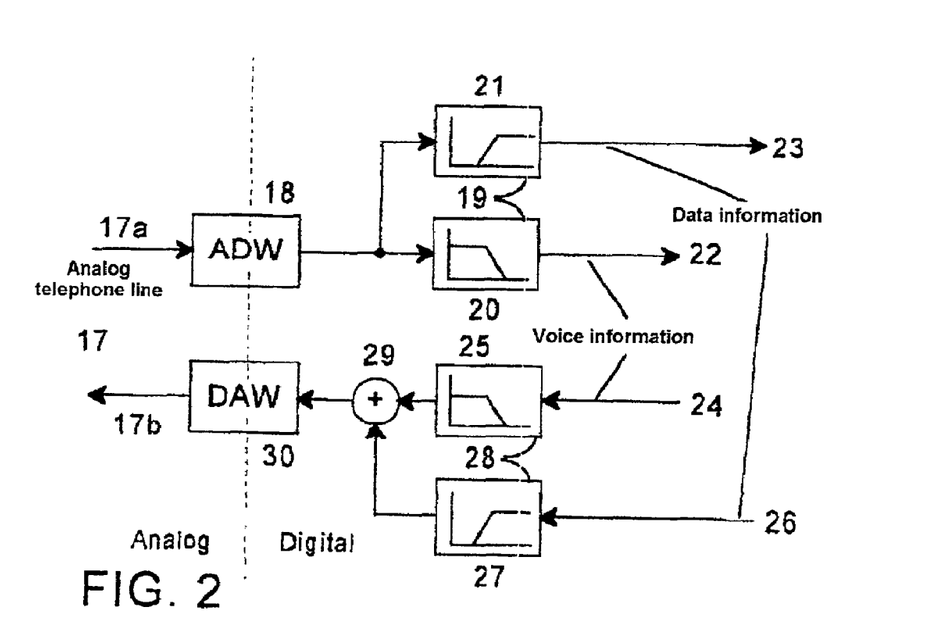
FIG. 2 shows the outline circuit diagram of another known solution for a line terminating device with a digital POTS splitter.

FIG. 2 shows the outline circuit diagram of a proposed solution of a line terminating device with an analog POTS splitter. In the first transmission direction, that is to say in the reception direction of the line terminating device illustrated in FIG. 2, a broadband analog signal is first of all passed, in the reception path, via the receiving line 17a of an analog telephone subscriber access line 17, to an analog/digital converter 18, which is followed by a digital POTS splitter 19.

This POTS splitter 19 firstly contains a low-pass filter 20 which is designed such that a first digital voice signal is filtered out of the output signal from the analog/digital converter 18. Secondly, the POTS splitter 19 contains a first digital high-pass filter 21, which is designed such that a first data signal is filtered out of the output signal from the analog/digital converter 18.

The first digital voice signal, which is produced at an output 22, can then be supplied to further processing, in the same way that the first digital data signal which is produced at an output 23 can be supplied to further processing.

In the opposite transmission direction, that is to say in the outward transmission direction, a second digital voice signal is supplied via an input 24 to a digital low-pass filter 25, and a second digital data signal is supplied via an input 26 to a high-pass filter 27. The digital low-pass filter 25 and the digital high-pass filter 27 form a digital POTS splitter 28, which can be set and varied by programming the filter coefficients of the two digital filters 25 and 27.

After being filtered in the POTS splitter 28, the digital voice signal and the digital data signal are added in a digital adder 29 to form a digital transmission signal, and are supplied to a digital/analog converter 30. The digital/analog converter 30 converts the digital transmission signal, which has been joined together, into an analog broadband transmission signal, which is supplied to the transmission line 17b of the analog telephone subscriber access line 17 for transmission.

Despite all the advantages over the analog POTS splitter solution as shown in FIG. 1, the proposed it digital POTS splitter solution as shown in FIG. 2 still has mutual interactions between the two transmission systems, namely that for transmitting data signals and that for transmitting voice signals.

Figure 3:
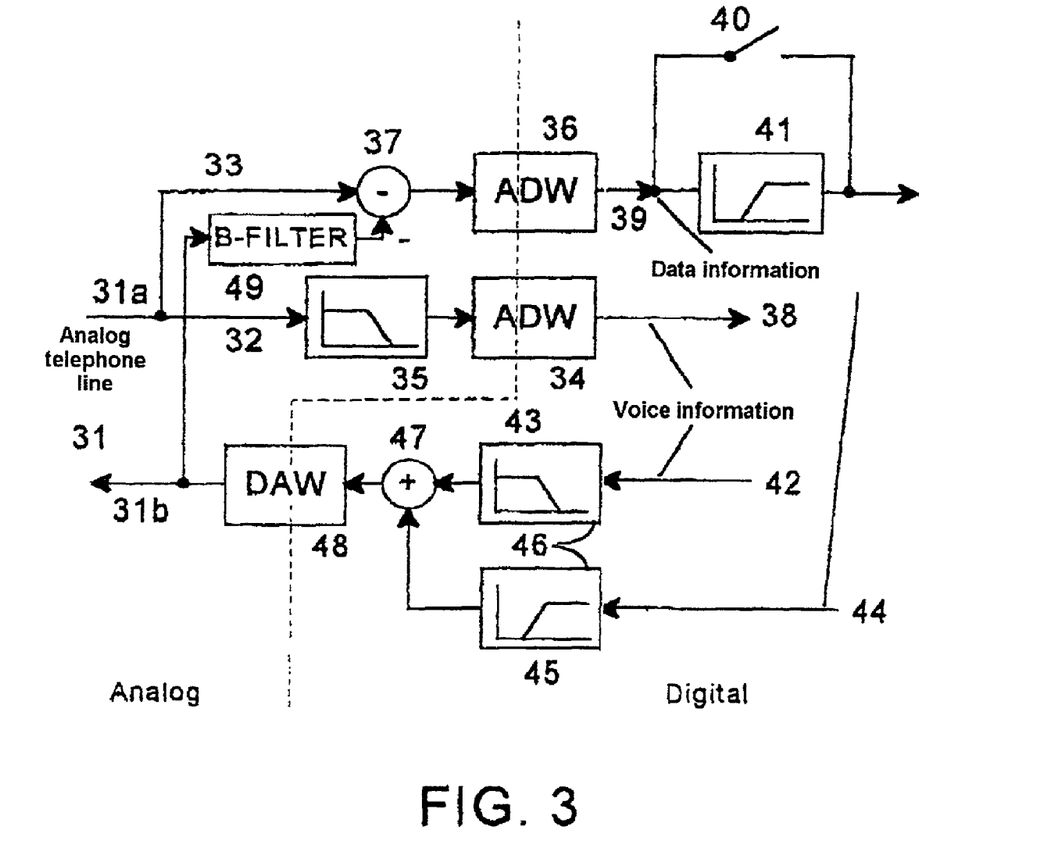
FIG. 3 shows the outline circuit diagram of the new separation solution in a line terminating device according to the invention.

FIG. 3 shows the outline circuit diagram of a solution, proposed by the invention, for a line terminating device which does not have the disadvantages of the known solutions described with reference to FIGS. 1 and 2.

In the first transmission direction, that is to say in the reception direction of the line terminating device according to the invention illustrated in FIG. 3, a broadband analog signal is supplied in the reception path via the receiving line 31a of an analog telephone subscriber access line 31 and is split into two paths 32 and 33, one of which, 32, is intended to provide analog transmission of first, low-frequency narrowband voice signals, and the other of which, 33, is intended for transmission of first, higher-frequency broadband data signals. An analog low-pass filter 35 for voice band limiting is also arranged upstream of an analog/digital converter 34 in the analog voice signal path 32.

There is another subtraction element 37, upstream of an analog/digital converter 36, in the branching data signal path 33. The first digital voice signal, which is produced at an output 38, can then be supplied to further processing, in the same way that the first digital data signal which is produced at an output 39 and, in the illustration shown, is also filtered via a digital high-pass filter 41 which can be switched off by means of a switch 40, can be supplied to further processing. The high-pass filter 41, which can be switched off, is provided so that a voice band modem can be used via the analog data signal path 33 when the switch 40 is closed.

In the opposite transmission direction, that is to say in the outward transmission direction, a second digital voice signal is supplied via an input 42 to a digital low-pass filter 43, and a second digital data signal is supplied via an input 44 to a high-pass filter 45. The digital low-pass filter 43 and the digital high-pass filter 45 form a digital POTS splitter 46, which can be set and varied by programming the filter coefficients of the two digital filters 43 and 45. After being filtered in the POTS splitter 46, the digital voice signal and the digital data signal are added in a digital adder 47 to form a digital transmission signal, and are supplied to a digital/analog converter 48. The digital/analog converter 48 converts the digital transmission signal, which has been joined together, to an analog broadband transmission signal, which is supplied to the transmission line 31b of the analog telephone subscriber access line 31 for transmission.

Major importance is attached to a balance filter 49, which is arranged between the broadband transmission signal output at the output of the digital/analog converter 48 and the subtraction input of the subtraction element 37 in the analog data signal path 33 of the reception path. The balance filter 49 is thus actuated by the analog broadband transmission signals supplied to the transmission line 31b of the subscriber access line 31, and its output signal is linked to a received signal which is introduced to the analog data signal path 33.

The balance filter 49 is thus used for data echo cancellation in the data signal path. In contrast, in the transmission direction, the two signal paths are separated by means of the two digital filters 43 and 45, which together form a digital POTS splitter 46. The echo cancellation path for the data and an impedance matching loop for the voice band are thus interrupted, and the mutual interaction is thus reduced to a minimum.

Figure 4:
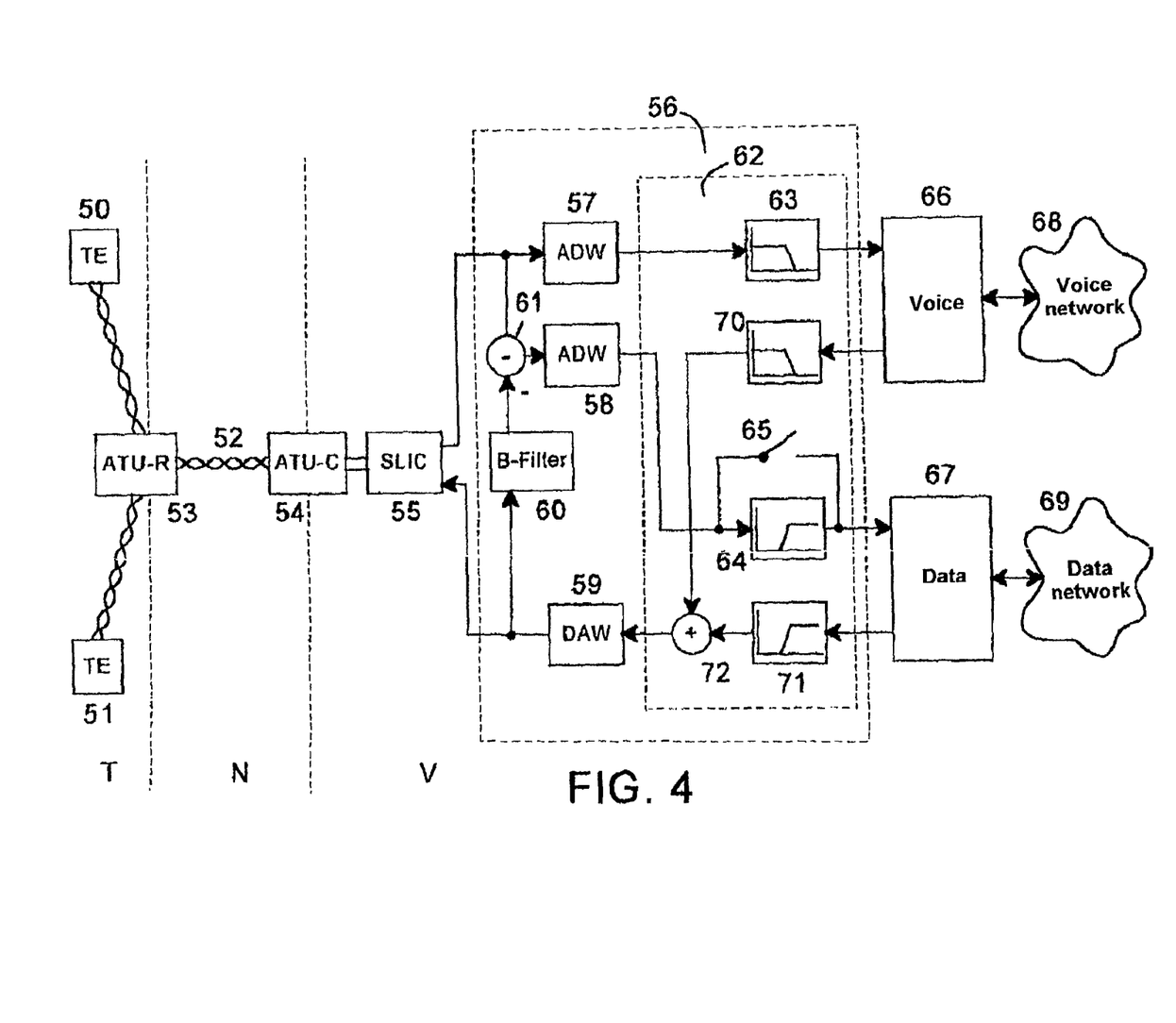
FIG. 4 shows the layout of a transmission path between a subscriber and a central office, with a first exemplary embodiment of the line terminating device according to the invention.
Figure 5:
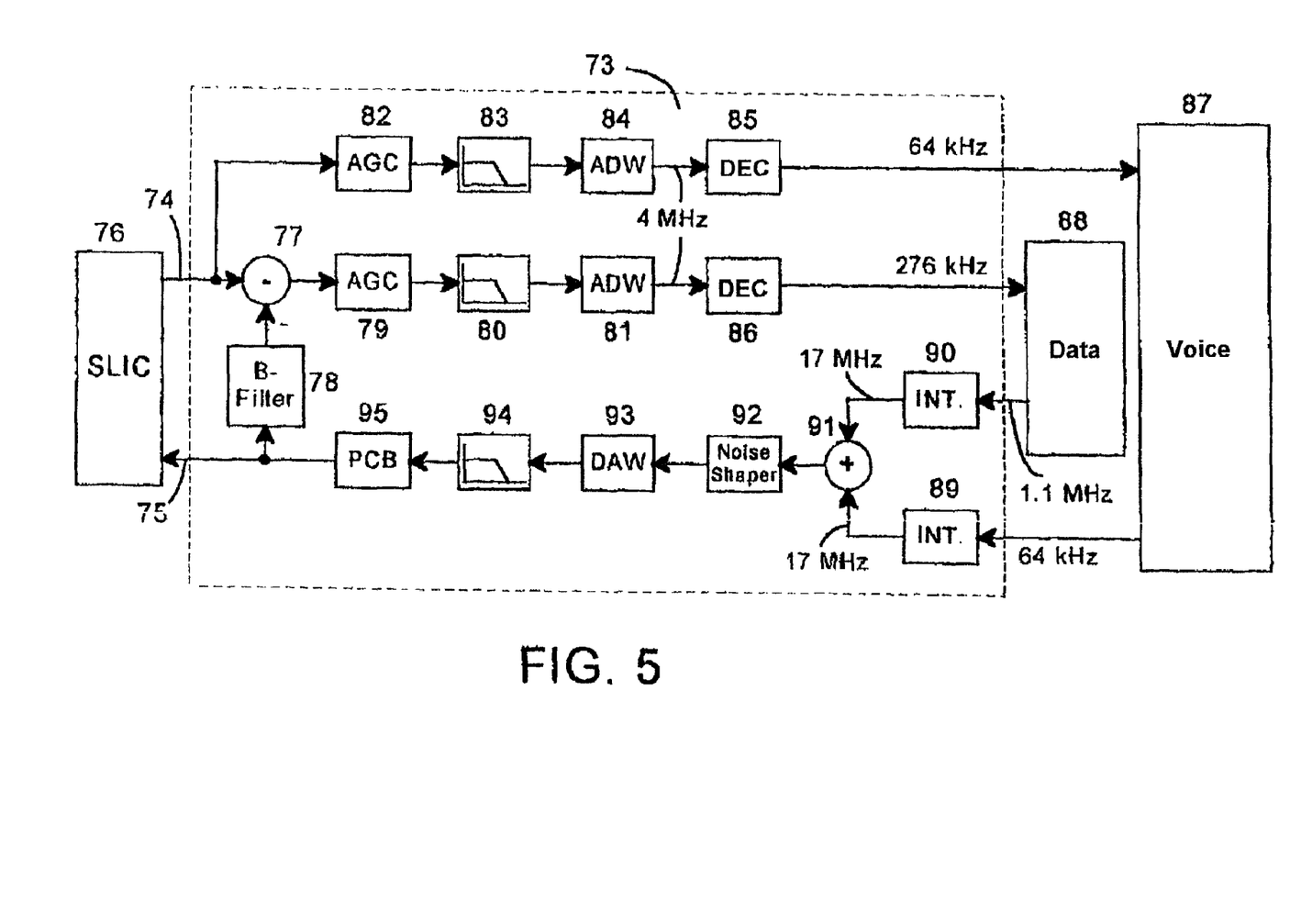
FIG. 5 shows a block diagram of a second exemplary embodiment of the line terminating device according to the invention.

The exemplary embodiments illustrated in FIGS. 4 and 5 show the use of the line terminating device according to the invention in a central office, for example. However, the line terminating device can just as well be used by a subscriber.

In the circuit illustrated in FIG. 4, a subscriber T transmits and receives both a narrowband low-frequency voice signal using an analog subscriber terminal 50 which, by way of example, may be a telephone or a voice band modem, and a broadband higher-frequency data signal using a digital subscriber terminal 51 which may be, for example, a computer with an ADSL modem, via a subscriber access line 52, which is part of a telephone network N and consists of a double copper wire, to a central office V. For this purpose, the analog subscriber terminal 50 and the digital subscriber terminal 51 are each connected via a two-wire line to a first subscriber access 53 (ATU-R=ADSL Transmission Unit Remote), with the first subscriber access 53 being connected to the subscriber access line 52.

In the central office V, the subscriber access line 52 is connected to a second subscriber access 54 (ATU-C=ADSL Transmission Unit Central). The second subscriber access 54 is in turn connected via a two-wire line to a subscriber line circuit 55 (SLIC=Subscriber Line Interface). The subscriber line circuit 55 is used for electrical matching to the subscriber access line 52, and acts as a hook circuit for the bidirectional subscriber access line 52.

The subscriber line circuit 55 is connected to a line terminating device 56 which has two analog/digital converters 57 and 58, a digital/analog converter 59, a balance filter 60, a subtraction element 61 and a digital POTS splitter 62.

In a further transmission direction (=reception direction for the line terminating device 56), a broadband analog signal is converted by the analog/digital converter 57 to a digital received signal for voice on the line terminating device 56, in a branching analog signal path for voice signals. An oversampling sigma-delta analog/digital converter is preferably used for this purpose, since only low-order, simple antialiasing filters are required for band limiting. Separately from this, the broadband analog signal is passed via the subtraction element 61 in a signal path for data signals, and is converted in the analog/digital converter 58 to a digital received signal. An oversampling sigma-delta analog/digital converter is preferably also used for this purpose. The subtraction input of the subtraction element 61 is supplied with the output signal from the balance filter 60.

The analog/digital converter 57 in the voice path is followed, in the digital POTS splitter 62, by a first digital low-pass filter 63, and the analog/digital converter 58 in the data path is followed by a first digital high-pass filter 64, which can be bridged by means of a switch 65. The filter function can in this case be adjusted by programming the filter coefficients. If the first digital low-pass filter 63 and the first digital high-pass filter 64 are formed by a program in a digital signal processor, the order of the filter can also be adjusted, in contrast to a hard-wired digital filter, by amending the program, in which only the filter coefficients are adjustable.

The first digital low-pass filter 63 filters a first digital voice signal out of the output signal from the analog/digital converter 57. The first digital high-pass filter 64 filters a first digital data signal out of the output signal from the analog/digital converter 58.

The first digital voice signal and the first digital data signal are then supplied to a digital voice processing device 66 and, respectively, a digital data processing device 67, which process the first digital voice signal and the first digital data signal, respectively, and feed them respectively to a digital voice network 68 and to a digital data network 69. The digital voice network 68 and the digital data network 69 connect corresponding central offices to one another.

In a second transmission direction (=transmission direction for the line terminating device 56), the digital voice processing device 66 and the digital data processing device 67 receive a second digital voice signal and, respectively, a second digital data signal via the digital voice network 68, and the digital data network 69, respectively.

The digital voice processing device 66 and the digital data processing device 67 pass the second digital voice signal and the second digital data signal, respectively, to a second digital low-pass filter 70 and a second digital high-pass filter 71, respectively, in the digital POTS splitter 62. In this case, the second digital low-pass filter 70 and the second digital high-pass filter 71 can be adjusted by programming the filter coefficients.

If the second digital low-pass filter 70 and the second digital high-pass filter 71 are formed by a program in a digital signal processor, then, in contrast to a hard-wired digital filter, the order of the respective filter can also be adjusted by amending the program, in which only the filter coefficients are adjustable.

After the filtering, the digital voice signal and the digital data signal are added in a digital adder 72 to form a digital transmission signal, and are supplied to the digital/analog converter 59. The digital/analog converter 59 converts the digital transmission signal to an analog broadband transmission signal, which is supplied to the subscriber line circuit 55 for transmission via the subscriber access line 52. A part of this analog broadband transmission signal is tapped off in the line terminating circuit 56 from the output of the digital/analog converter 59 and is supplied to the balance filter 60, whose output signal is fed to the subtraction input of the subtraction element 61 in the analog data signal path at the reception end.

Figure 10:
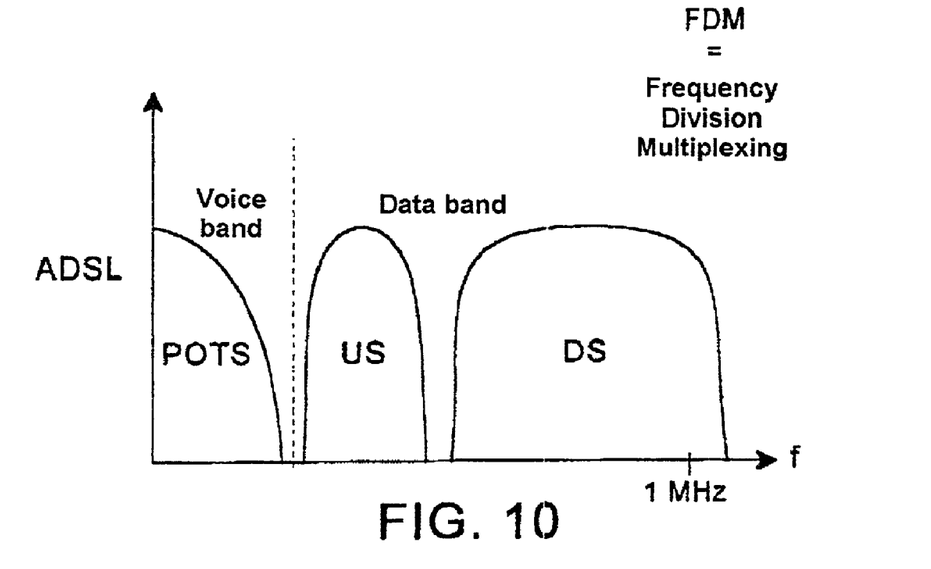
FIG. 10 shows a first diagram with the spectral distribution of voice band and data band.
Figure 11:
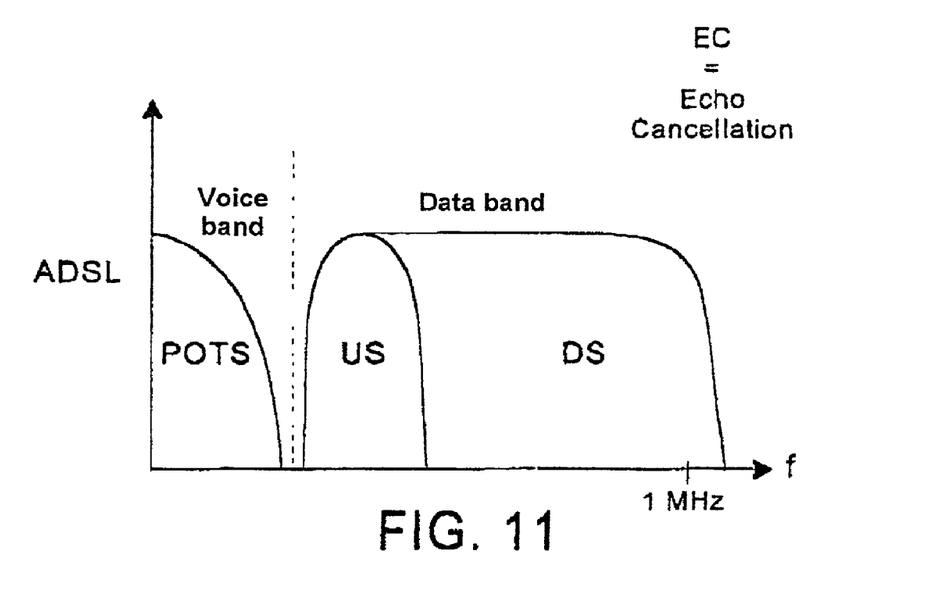
FIG. 11 shows a second diagram with the spectral distribution of voice band and data band.

The spectral distribution on the subscriber access line 52 during transmission using the ADSL method is illustrated in FIG. 10 and FIG. 11, and will be explained in the following text.

The transmission bandwidth of a double copper wire (two-wire line) is about 1.1 MHz. The voice band (POTS) is located in a lower frequency band, schematically starting at 0 Hz. The data band starts above the voice band, and is split into a first frequency band US and a second frequency band DS.

Data is transmitted from a subscriber to a central office in a first frequency band US (=upstream frequency band); and data is transmitted from the central office to the subscriber in the second frequency band DS (=downstream frequency band). In the ADSL methods, the upstream frequency band is narrower than the downstream frequency band.

The splitting of the data band (illustrated in FIG. 10) into two separate frequency bands for data transmission in two separate frequency bands US and DS is referred to as frequency division multiplexing (FDM).

FIG. 11 likewise shows the spectral distribution of the narrowband POTS voice band and of the broadband data band for the ADSL data transmission method, with the data band having a composite frequency band, which covers both the upstream frequency band US and the downstream frequency band DS. Since the upstream and downstream frequency bands partially overlap, echo cancellation (EC) must be used for separation of the upstream and downstream frequency bands. The advantage of data transmission with echo cancellation is that the downstream frequency band is broader, thus allowing a higher data rate from the central office to the subscriber.

FIG. 5 shows the block diagram of a second exemplary embodiment of a line terminating device according to the invention for a subscriber access line.

The line terminating device which is annotated 73 and is advantageously in the form of an integrated circuit module is connected via a receiving line 74 and a transmission line 75 to a subscriber line circuit 76. A broadband received signal, which is supplied from the subscriber line circuit 76 via the receiving line 74 to the line terminating device 73, is separated there into an analog voice signal path and into an analog data signal path and, in the latter, is initially supplied to an analog subtraction element 77.

The analog subtraction element 77 subtracts from the received signal a transmission signal which is contained in the received signal and provides data signal echo cancellation. This is done by using a balance filter 78 to filter the transmission signal. The balance filter 78 filters out the analog voice signals, which are contained in the transmission signal, by means of high-pass filtering. The voice signals are therefore not subject to echo cancellation. The balance filter 78 uses a transfer function which corresponds to the transfer function of the connected double copper wires for filtering. The signal produced at the output of the balance filter 78 thus corresponds to an echo signal, contained in the received signal, of the transmission signal, and is subtracted by the analog subtraction element 77 from the received signal in the analog data signal path.

In the analog data signal path, the analog subtraction element 77 is followed by a circuit 79 for automatic gain control (AGC). The echo-cancelled data signal is applied to the input of the AGC circuit 79. In the analog data signal path, the AGC circuit 79 controls the amplitude of the echo-cancelled received signal for further processing, so that frequencies in the data band which have a low spectral power level are amplified.

The AGC circuit 79 is followed by an antialiasing filter 80 for band limiting, which filters out all the frequencies above the upstream frequency band of the data band, corresponding to the sampling rate of a downstream analog/digital converter 81. The antialiasing filter 80 is followed by an oversampling sigma-delta analog/digital converter, as the analog/digital converter 81, which converts the analog, echo-cancelled, controlled-amplitude and band-limited data received signal to a digital data received signal.

The analog voice signal path, which is separated at the reception input of the line terminating device 73, also first of all contains an AGC circuit 82, followed by an antialiasing filter 83 for band limiting, which filters out all the frequencies above the voice band corresponding to the sampling rate of a downstream analog/digital converter 84, which may likewise be in the form of an oversampling sigma-delta analog/digital converter.

The digital received signal tapped off at the output of the analog/digital converter 84 in the voice path is supplied to a first decimation filter 85, and the digital received signal tapped off at the output of the analog/digital converter 81 in the data path is supplied to a second decimation filter 86. The first decimation filter 85 carries out digital low-pass filtering of the digital received signal in the voice path and then, by decimation, reduces the sampling rate from 4 MHz to a sampling rate of 64 kHz, so that a 1-bit data stream at a sampling rate of 64 kHz (64 kbps data stream) is produced at the output of the first decimation filter 85. This 64 kbps data stream is suitable for further voice processing, and for feeding to the digital voice network. The cut-off frequency of the digital low-pass filtering is set such that the data band is filtered out of the digital received signal, and only the voice band remains. The 64 kbps data stream which is produced at the output of the first decimation filter 85 is then supplied to a digital voice processing device 87.

The second decimation filter 86 likewise carries out low-pass filtering of the digital received signal, and then reduces the sampling rate from 4 MHz to a sampling rate of 276 kHz, so that a 1-bit data stream at 276 kHz (276 kbps data stream) is produced at the output of the second decimation filter 86. In this case, the cut-off frequency of the low-pass filtering is above the highest frequency in the data band. The 256 kbps data stream which is produced at the output of the second decimation filter 86 is supplied to a data processing device 88 for further processing. The data processing device 88 can supply the 276 kbps data stream to high-pass filtering, which is not shown in FIG. 5, in order to filter out any residues of the digital voice signal which are still present.

The processing of a transmission signal by the line terminating device 73 will be described in the following text.

A digital voice signal to be transmitted, represented by a 1-bit data stream at a sampling rate of 64 kHz, is supplied from the voice processing device 87 to a first interpolation filter 89 in the line terminating device 73. The first interpolation filter 89 increases the sampling rate from 64 kHz for the digital voice signal to a sampling rate of 17 MHz for further processing.

A digital data signal which is to be transmitted, represented by a 1-bit data stream at 1.1 MHz, is supplied from the data processing device 88 to a second interpolation filter 90 in the line terminating device 73. The second interpolation filter 90 likewise increases the sampling rate from 1.1 MHz for the digital data signal to the sampling rate of 17 MHz for further processing. After the interpolation, the digital voice signal and the digital data signal have the same sampling rate, of 17 MHz.

Both signals are supplied to a digital adder 91, which produces a digital transmission signal by addition of the digital voice signal and digital data signal. The digital transmission signal is supplied to a digital noise-shaper filter 92, which suppresses the quantization noise contained in the digital transmission signal. Furthermore, the noise-shaper filter 92 matches the word length of the digital transmission signal to the processing word length of a downstream digital/analog converter 93.

The digital transmission signal filtered in this way is then converted by the digital/analog converter 93 to an analog broadband transmission signal, which is filtered by a low-pass filter 94 following the digital/analog converter 93. The cut-off frequency of the low-pass filter 94 is in this case above the highest frequency in the data band. The low-pass filter 94 filters interference frequencies above the spectrum used for transmission. A power matching circuit 95 (PCB Power Cutback) following the low-pass filter 94 is used to match the spectral power distribution of the broadband transmission signal for further processing in the subscriber line circuit 76, to which the broadband transmission signal is supplied via the transmission line 75. Particularly if the subscriber line lengths are short, the spectral power of the broadband transmission signal is reduced, in order to reduce the power loss and to avoid drive-level problems.

A portion of this analog broadband transmission signal is tapped off in the line terminating device 73 from the output of the power matching circuit 95 and is supplied to the balance filter 78, whose output signal is fed to the subtraction input of the subtraction element 77 in the reception-end analog data signal path.

There are no analog POTS splitters in the circuit described above and as shown in FIG. 5. The additional splitting of the analog reception path (in the example this is the upstream path) into the two separate paths for voice and data means that the matching of the analog/digital converters 81 and 84 to the corresponding signal levels is carried out optimally by the AGC stages 79 and 82, which are designed differently.

The echo cancellation path for the data signals via the balance filter 78 and via an impedance matching loop are different, so that different impedance requirements can be satisfied with minimal mutual interaction. The balance filter 78 required for analog echo cancellation may be in analog or else digital form.

Figure 6:
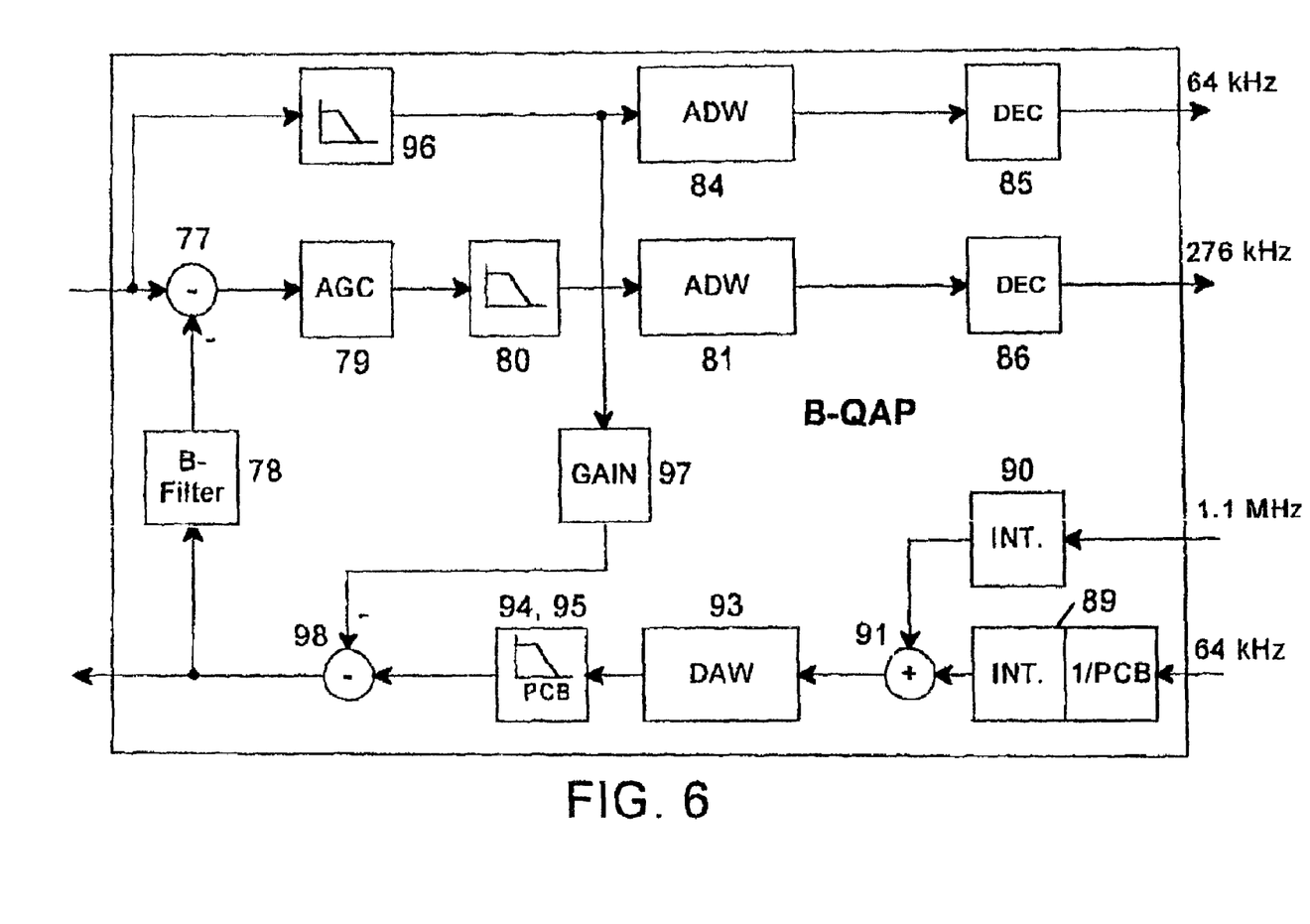
FIG. 6 shows the block diagram of a first exemplary embodiment of a line terminating card (B-QAP; Broadband-Quad Analog POTS), which may be in the form of an integrated circuit module (chip), with an analog/digital broadband line terminating device according to the invention.
Figure 7:
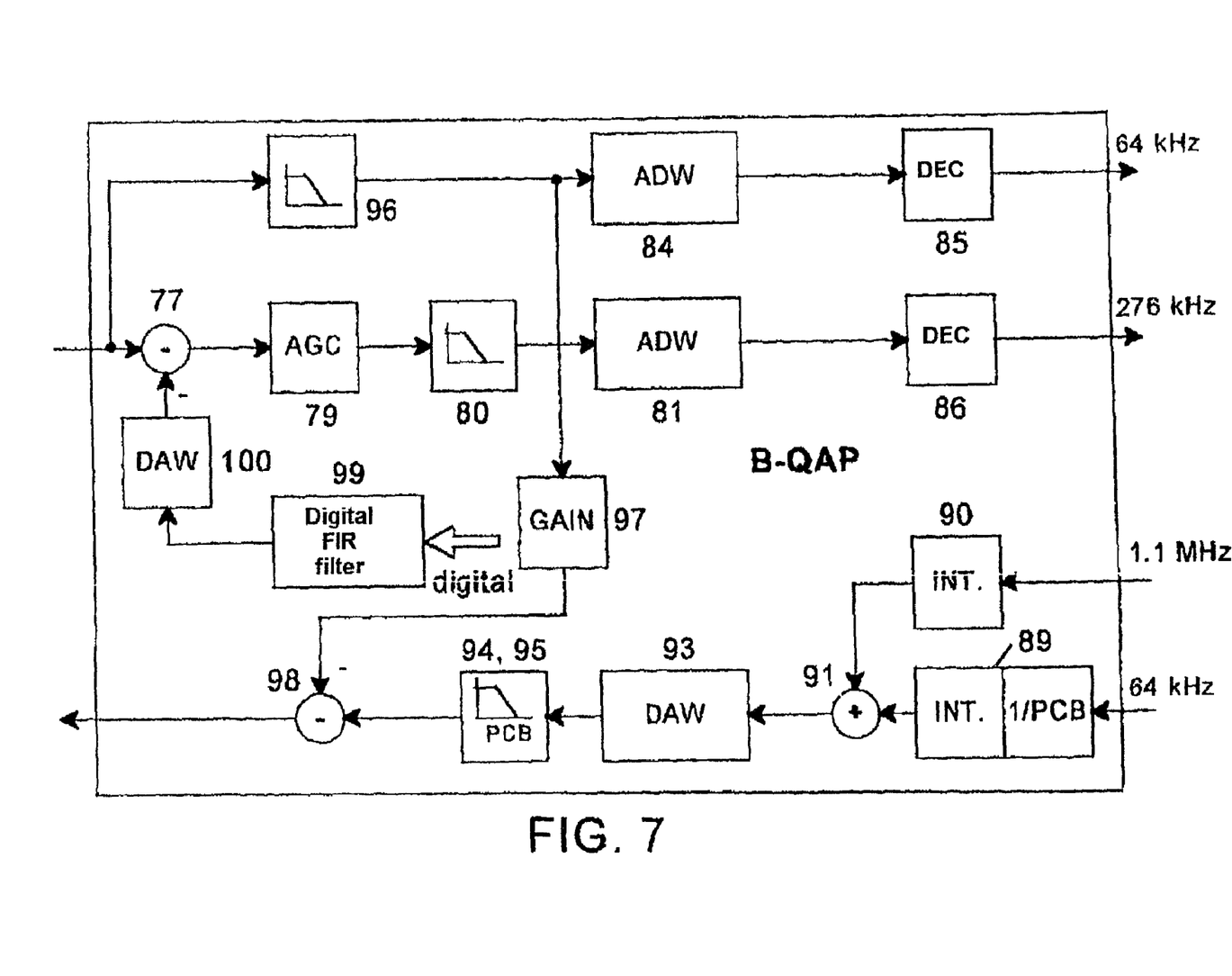
FIG. 7 shows the block diagram of a second exemplary embodiment of a line terminating card (B-QAP), which can likewise be produced as an integrated circuit module, with an analog/digital broadband line terminating device according to the invention.

FIGS. 6 and 7 illustrate two variants of a line terminating device (Line Card: B-QAP; Broadband-Quad Analog POTS), which essentially correspond to the line terminating device 73 used in the circuit shown in FIG. 5, and are in the form of a standard, integrated circuit module.

Only one voice-band-limiting low-pass filter 96 is provided before the analog/digital converter 84 in the analog voice signal reception path. The balance filter 78 is in analog form. A variable amplification element 97 can be provided for impedance matching in the voice band to a line which is installed on the analog side, but is not illustrated in FIG. 6, and this variable amplification element 97 is actuated by the received analog voice signal in the voice signal path. The output from amplification element 97 is connected to the subtraction input of an analog subtraction element 98, via whose other input and via whose output the analog broadband transmission signal is passed.

The variant of the line terminating device shown in FIG. 7 differs from that shown in FIG. 6 only in that the balance filter is in digital form, as a digitally controlled FIR filter 99, which is followed by a digital/analog converter 100.

Figure 8:
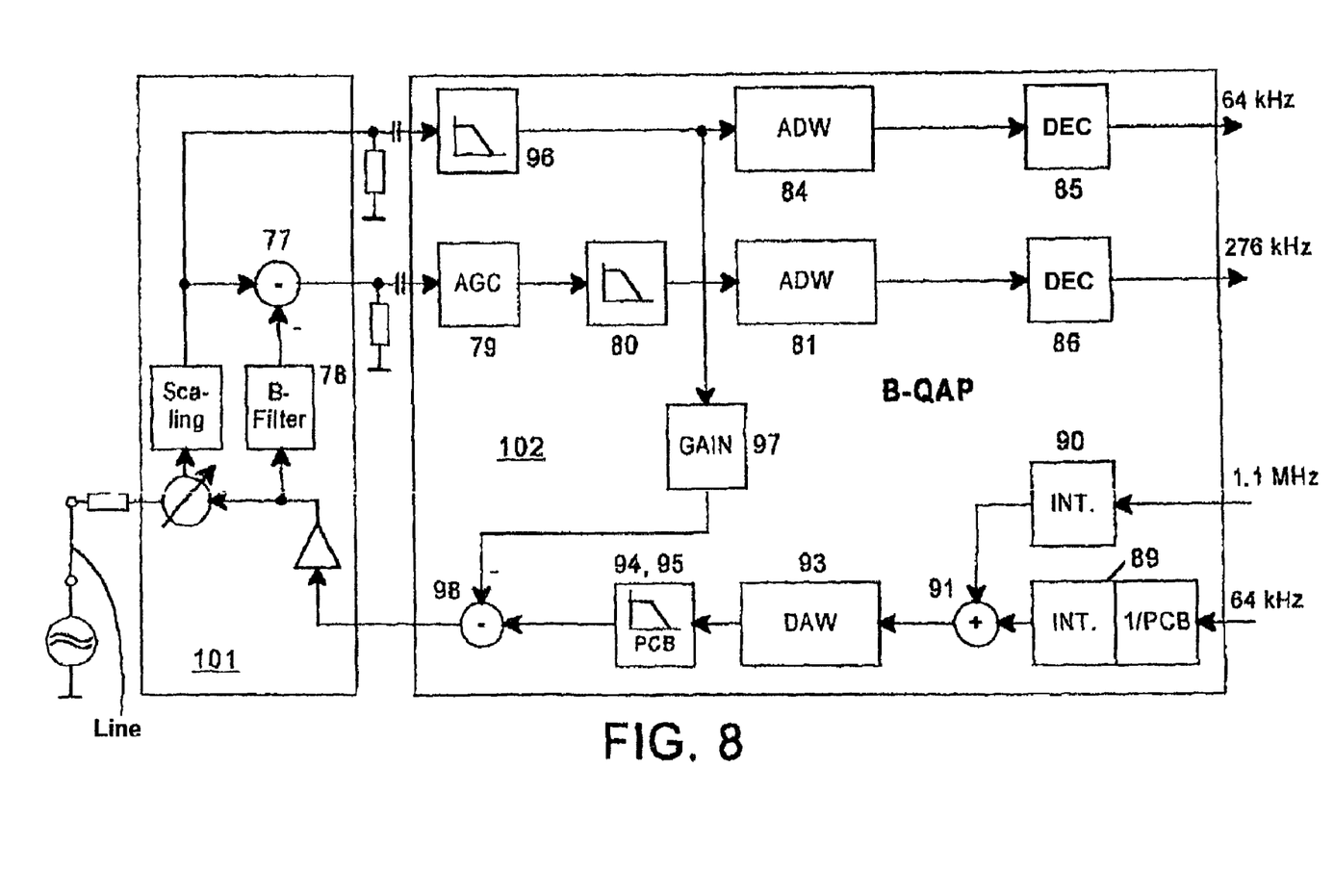
FIG. 8 shows the block diagram of the overall architecture of a third exemplary embodiment of an analog/digital voice/data line terminating device card, comprising two integrated circuit modules, according to the invention.

FIG. 8 shows an exemplary embodiment of a line terminating device (Line Card), which can be used in particular for implementation of xDSL methods, for example ADSL-.Lite or G.Lite, with two integrated circuit modules 101 and 102, which form a chip set, and of which the circuit module 101 is a subscriber line circuit (B-SLIC; Broadband Subscriber Line Interface Circuit) in the form of an analog high-voltage module which supplies power to the subscriber access line and is used as a matching element to the subscriber access line and hook circuit, and the other circuit module 102 is a low-voltage module.

The particular feature of the implementation shown in FIG. 8 is that the separation of the voice band and the data band is carried out in the reception direction (upstream direction) in the analog high-voltage part, which is provided by the integrated circuit module 101, while, in contrast, the separation of these two bands in the transmission direction (downstream direction) takes place in the region of the digital filters in the low-voltage module 102. This particular separation solution at the receiving end means that the separate high-voltage module 101 also contains the balance filter 78 and the subtraction element 77. A capacitive coupling is in each case provided between the two integrated circuit modules 101 and 102 in the two separate paths for data and voice in the reception direction, thus preventing any DC connection there. In FIG. 8, blocks having corresponding functions have the same reference symbols as in FIG. 6.

The chip architecture can also be designed, taking account of safety margins, such that the balance filter 78 and the subtraction element 77, and hence the entire reception-end (upstream) separation into the analog voice and data signal paths are arranged in a common integrated circuit module, which thus also contains the transmission-end (downstream) digital filter separation in a digital part.

Figure 9:
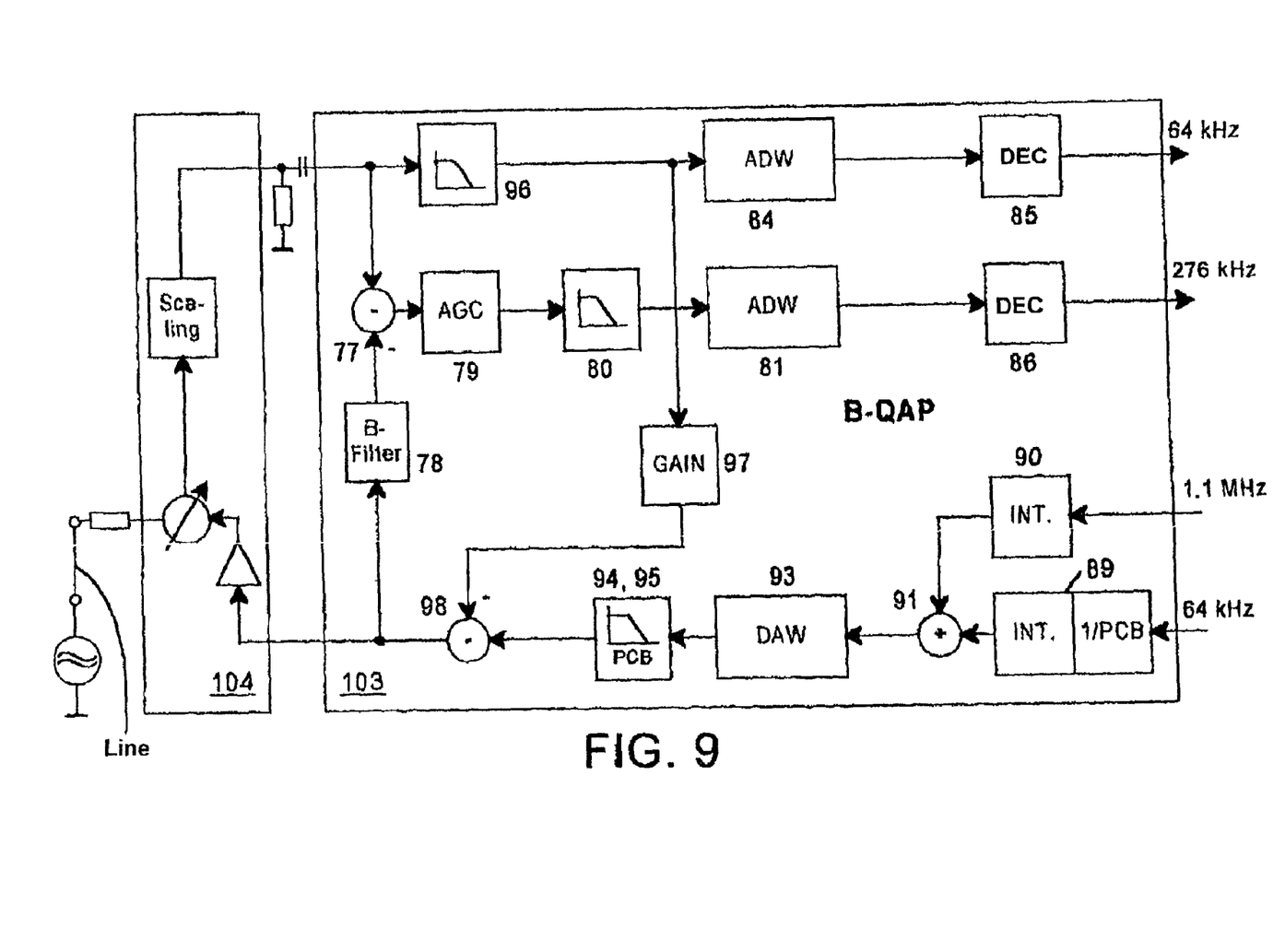
FIG. 9 shows the block diagram of the overall architecture of a fourth exemplary embodiment of an analog/digital voice/data line terminating device card, contained in integrated circuit technology, according to the invention.

Such an overall architecture is shown in block-diagram form in FIG. 9, according to which the subscriber line circuit (B-SLIC; Broadband Subscriber Line Interface Circuit), which supplies power to the subscriber access line and is used as a matching element to the subscriber access line and to the hook circuit, is contained in a first integrated circuit module 103, and the reception-end and transmission-end data and voice signal separation (B-QAP) is contained in a second integrated circuit module 104. The blocks having corresponding functions are also provided with the same reference symbols in FIG. 9 as in FIG. 6, which shows a similar circuit in the form of a block diagram.

What is claimed is:

1. A line terminating device for reception-path-end separation of an analog first broadband signal, which is transmitted via a telephone subscriber access line, firstly to a low-frequency, narrowband first voice signal and secondly to a broadband first data signal, which is at a higher frequency than the first voice signal, by a reception path and for joining together, at the transmission-path end, firstly a low-frequency, narrowband second voice signal and secondly a broadband second data signal, which is at a higher frequency than the second voice signal, to form an analog second broadband signal which can be transmitted via this telephone subscriber access line in the transmission direction, by a transmission path,
    (a) wherein the transmission path comprises
        a1) a digital frequency splitter, which joins together the second voice signal, which is in digital form, and the second data signal, which is in digital form, to form a digital transmission signal, and
        a2) a digital-to-analog converter being preceded by the digital frequency splitter, which converts the digital transmission signal to the analog second broadband signal to be transmitted in the transmission direction,
    (b) wherein the reception path, which carries the first analog broadband signal,
        b1) is subdivided into an analog path for voice signals and a path, which is separate from this, for data signals,
        b2) wherein an analog-to-digital converter is provided at the end of each of these two paths for conversion to respectively corresponding digital signals, and
        b3) wherein a balance filter, which is driven by the second analog broadband signal, is arranged between the transmission path after the output of the digital-to-analog converter and the subtraction input of a subtraction element, which is connected upstream of the analog-to-digital converter in the separate analog data signal path of the reception path.

2. The line terminating device as claimed in claim 1, wherein at least one of the two analog-to-digital converters is preceded by a circuit for automatic gain control of the received analog signals.

3. The line terminating device as claimed in claim 2, wherein the analog-to-digital converters are followed by means for digitally filtering out the first digital voice signal and the first digital data signal.

4. The line terminating device as claimed in claim 2, wherein a low-pass filter is arranged upstream of the analog-to digital converter in the separate analog voice signal path of the reception path.

5. The line terminating device as claimed in claim 1, wherein the balance filter to be used may be in analog or digital form.

6. The line terminating device as claimed in claim 5, wherein the analog-to-digital converters are followed by means; for digitally filtering out the first digital voice signal and the first digital data signal.

7. The line terminating device as claimed in claim 1, wherein a digital high-pass filter, which can be switched off, is provided following the analog-to-digital converter in the path which is responsible for data signals.

8. The line terminating device as claimed in claim 7, wherein the analog-to-digital converters are followed by means for digitally filtering out the first digital voice signal and the first digital data signal.

9. The line terminating device as claimed in claim 1, wherein the analog-to-digital converters are followed by means for digitally filtering out the first digital voice signal and the first digital data signal.

10. The line terminating device as claimed in claim 1, wherein a low-pass filter is arranged upstream of the analog-to digital converter in the separate analog voice signal path of the reception path.

11. The line terminating device as claimed in claim 1, wherein the digital-to-analog converter arranged in the transmission path is followed by a power adaptation circuit for adaptation of the spectral power distribution.

12. A line terminating device for reception-path-end separation of an analog first broadband signal, which is transmitted via a telephone subscriber access line, firstly to a low-frequency, narrowband first voice signal and secondly to a broadband first data signal, which is at a higher frequency than the first voice signal, by a reception path and for joining together, at the transmission-path end, firstly a low-frequency, narrowband second voice signal and secondly a broadband second data signal, which is at a higher frequency than the second voice signal, to form an analog second broadband signal which can be transmitted via this telephone subscriber access line in the transmission direction, by a transmission path,
  (a) wherein the transmission path comprises
    a1) a digital frequency splitter comprising a digital low-pass filter for filtering the second voice signal and a digital high-pass filter for filtering the second data signal, wherein the digital frequency splitter joins together the second voice signal, which is in digital form, and the second data signal, which is in digital form, to form a digital transmission signal, and
    a2) a digital-to-analog converter being preceded by the digital frequency splitter, which converts the digital transmission signal to the analog second broadband signal to be transmitted in the transmission direction,
  (b) wherein the reception path, which carries the first analog broadband signal,
    b1) is subdivided into an analog path for voice signals and a path, which is separate from this, for data signals,
    b2) wherein an analog-to-digital converter is provided at the end of each of these two paths for conversion to respectively corresponding digital signals, and
    b3) wherein a balance filter, which is driven by the second analog broadband signal, is arranged between the transmission path after the output of the digital-to-analog converter and the subtraction input of a subtraction element, which is connected upstream of the analog-to-digital converter in the separate analog data signal path of the reception path.

13. A line terminating device for reception-path-end separation of an analog first broadband signal, which is transmitted via a telephone subscriber access line, firstly to a low-frequency, narrowband first voice signal and secondly to a broadband first data signal, which is at a higher frequency than the first voice signal, by a reception path and for joining together, at the transmission-path end, firstly a low-frequency, narrowband second voice signal and secondly a broadband second data signal, which is at a higher frequency than the second voice signal, to form an analog second broadband signal which can be transmitted via this telephone subscriber access line in the transmission direction, by a transmission path,
  (a) wherein the transmission path comprises
    a1) a digital POTS splitter comprising a digital low-pass filter for filtering the second voice signal and a digital high-pass filter for filtering the second data signal, wherein the digital POTS splitter joins together the second voice signal, which is in digital form, and the second data signal, which is in digital form, to form a digital transmission signal and can be set and varied by programming the filter coefficients of the digital low-pass filter and the digital high-pass filter, and
    a2) a digital-to-analog converter being preceded by the digital POTS splitter, which converts the digital transmission signal to the analog second broadband signal to be transmitted in the transmission direction,
  (b) wherein the reception path, which carries the first analog broadband signal,
    b1) is subdivided into an analog path for voice signals and a path, which is separate from this, for data signals,
    b2) wherein an analog-to-digital converter is provided at the end of each of these two paths for conversion to respectively corresponding digital signals, and
    b3) wherein a balance filter, which is driven by the second analog broadband signal, is arranged between the transmission path after the output of the digital-to-analog converter and the subtraction input of a subtraction element, which is connected upstream of the analog-to-digital converter in the separate analog data signal path of the reception path.

* * * * *

UNITED STATES PATENT AND TRADEMARK OFFICE
CERTIFICATE OF CORRECTION

| | | |
|---|---|---|
| PATENT NO. | : 7,164,708 B1 | Page 1 of 1 |
| APPLICATION NO. | : 10/031034 | |
| DATED | : January 16, 2007 | |
| INVENTOR(S) | : Joerg Hauptmann et al. | |

It is certified that error appears in the above-identified patent and that said Letters Patent is hereby corrected as shown below:

Title page, item (75), Inventors, change "Herbert Zoler" to --Herbert Zojer--.

Signed and Sealed this
Fifth Day of April, 2011

David J. Kappos
*Director of the United States Patent and Trademark Office*